June 9, 1925.
J. GALLAND
1,541,700
TRUCK FOR USE IN MANEUVERING AIRCRAFT
Filed Dec. 11, 1924      2 Sheets-Sheet 1
Fig.1
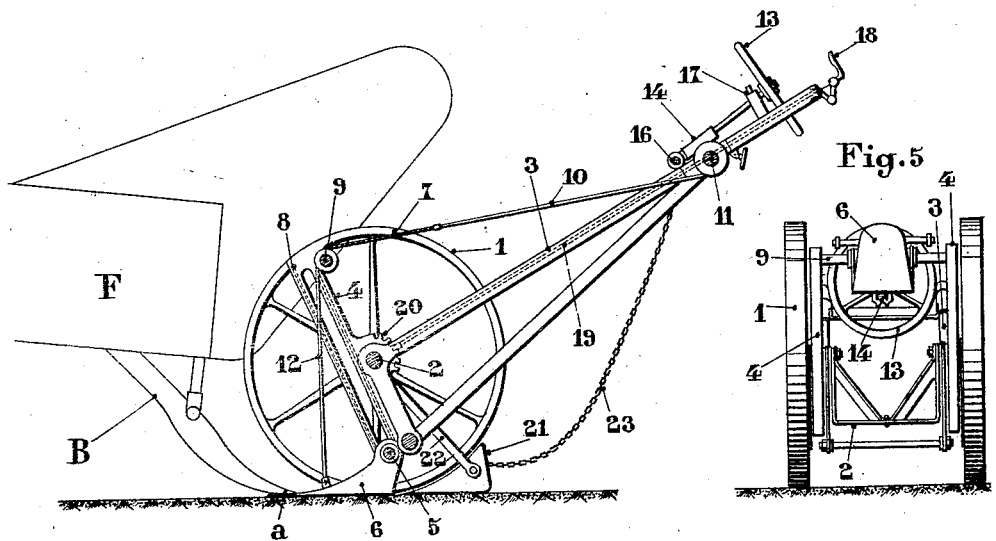
Fig.5
Fig.2
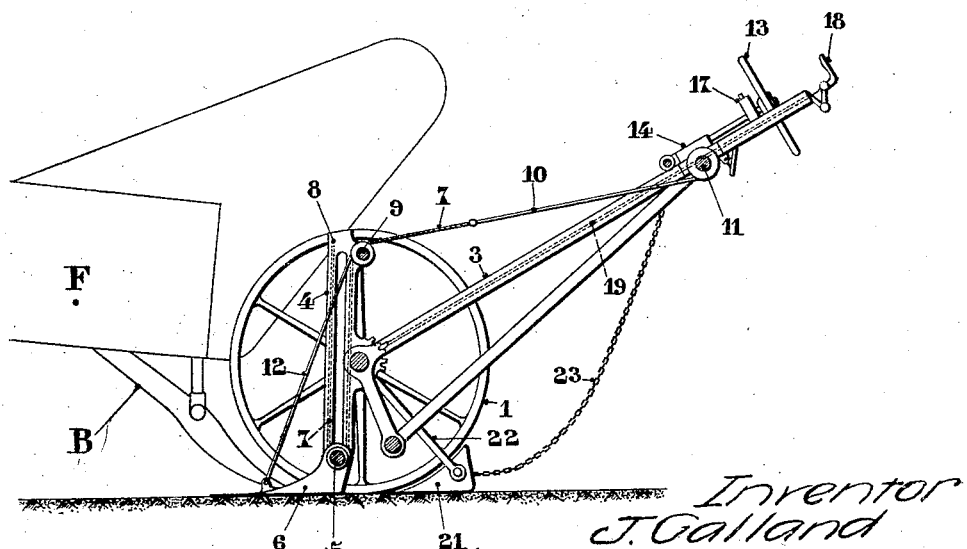
Inventor
J. Galland June 9, 1925.
J. GALLAND
TRUCK FOR USE IN MANEUVERING AIRCRAFT
Filed Dec. 11, 1924
1,541,700
2 Sheets-Sheet 2
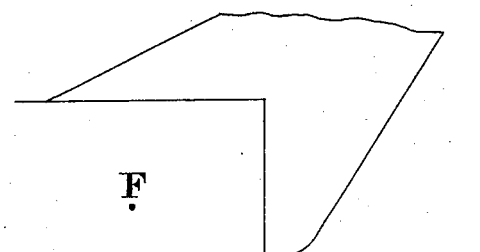
Fig.3
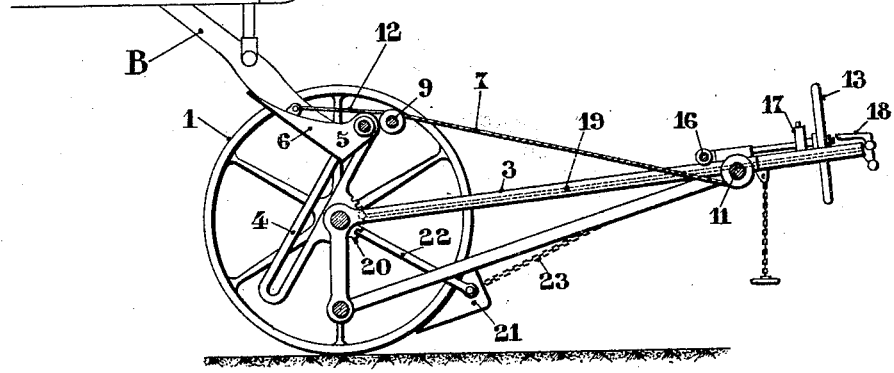
Fig.4
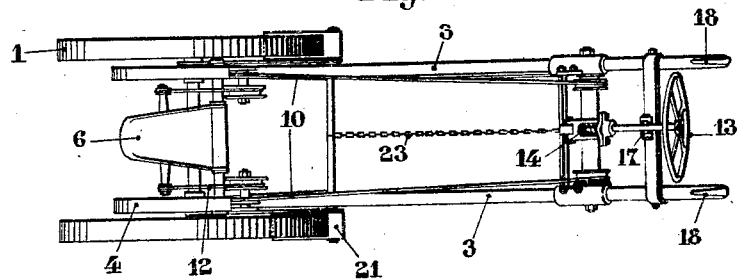
Fig.6
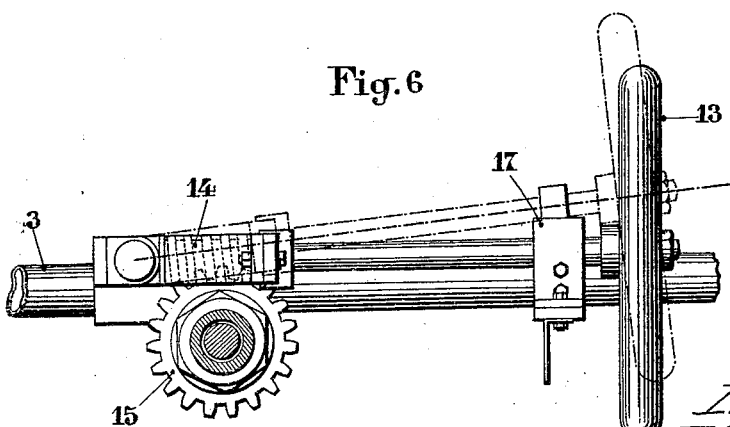
Inventor
J. Galland.
by Langner, Parry, Card & Langner
Attys.

Patented June 9, 1925.

1,541,700

UNITED STATES PATENT OFFICE.

JEAN GALLAND, OF BOULOGNE-SUR-SEINE, FRANCE.

TRUCK FOR USE IN MANEUVERING AIRCRAFT.

Application filed December 11, 1924. Serial No. 755,312.

*To all whom it may concern:*

Be it known that I, JEAN GALLAND, a French citizen, and resident of 28 Rue de la Rochefoucauld, Boulogne-sur-Seine, France, have invented certain new and useful Improvements in Trucks for Use in Maneuvering Aircraft, for which I have filed an application in France No. 194,261, dated 21st October, 1924, of which the following is a specification.

The maneuvering of aircraft in aeronautic centres actually gives rise to serious difficulties. For leaving the hangars or for entering these apparatus of small dimensions are usually raised by manual labour on rudimentary trucks by means of which the apparatus are pushed towards their destination. By reason of the shape of the fuselage and the low position which it occupies when the apparatus is on the ground, the operation of raising the apparatus is rendered very difficult and the presence of a number of men is required even for such small apparatus.

In some centres large aircraft is drawn by a power tractor or by an ordinary tractor, but their maneuvering requires not less than about ten men for raising the fuselage and for mounting it on the truck by means of its support.

It will be seen that this manner of operation renders the transport of aircraft on land very long and very tedious and that it necessitates a very important expense in manual labour. On the other hand and by reason of the difficulties of maneuvering the men are inclined to grip the apparatus at delicate points which are readily accessible to them such as cables, shrouds, fixed planes and so forth. There is therefore the risk of destroying or deranging parts of the aircraft without this being noticed.

Finally by reason of the difficulty of the maneuvering the men frequently place the fuselage too heavily on the ground which results in damaging or deranging parts of the aeroplane.

The present invention has for its subject a fuselage lifting truck arranged in such a manner as to enable the operation of lifting the fuselage to be effected without fatigue, without shock and by a single man irrespective of the dimensions of the aeroplane or the shape of the end of its fuselage.

The apparatus which will now be described has been particularly designed in order to enable it to be used with aeroplanes of all types and of all dimensions. For lifting the fuselage this apparatus acts solely on the supports. When the tail of the aeroplane has been raised and this is substantially in the line of flight, the apparatus may be blocked up instantaneously which renders the movements of the aeroplane on the ground particularly easy. The reverse operations for releasing the fuselage when the aeroplane is ready for flight or when it has been moved into its hangar are effected with the same facility.

The fuselage lifting truck forming the subject of the present invention is more particularly characterized by the combination with a train of wheels constituting the truck proper of a platform which is engaged under the support of the aeroplane, of slides in which the shaft of the platform can slide during the operation of raising the fuselage, of means enabling the said platform to be raised by a small power, of locking means enabling the slides to be locked or not to the framework of the truck as may be desired during the operation, of brake shoes for braking the wheels during the lifting operation, and finally a framework serving to support the various parts of the apparatus, the framework being also used for following and for guiding the aeroplane during its movement on the ground.

In the accompanying drawing is illustrated diagrammatically and by way of example only, one form of construction of the fuselage lifting truck.

Figure 1 is a side elevation (the wheel on the side turned towards the observer being omitted so as to enable the details of the apparatus to be seen) of the truck in the position which it occupies at the beginning of the operation.

Figure 2 is a similar view showing the support of the aeroplane partially engaged on the platform.

Figure 3 is a similar view showing the fuselage raised in the position for transport.

Figure 4 is a plan view of Figure 3.

Figure 5 is a view of the end of the apparatus from the side of the aeroplane and in the position of Figure 3, and Figure 6 shows to a larger scale a detail of the device for disengaging the operating means for the winch.

As will be seen in the drawing the apparatus is provided with two wheels 1 connected together by a cranked axle 2 on which is mounted a framework 3. On the axle are mounted guides 4 adapted to oscillate on the said axle and serving as guides for a shaft 5 which supports the trough 6 by means of which the truck raises the support of the fuselage.

The shaft 5 carries at each end a loose pinion around which passes a chain 7. One of the ends of this chain is attached at 8 to the upper part of the slides 4. The chain is guided in the said slides, passes around a return pinion 9 and its other end is attached to a cable 10 which is wound on a drum 11. The apparatus is provided with two drums 11 mounted on the framework 3 near its rear end.

Another cable 12, attached near the front end of the trough 6 is wound on a drum secured to the return pinion 9.

The drums 11 are controlled by means of a hand-wheel 13 on the shaft of which is provided a worm 14 gearing with a worm wheel 15 keyed to the common shaft of the drums 11.

It is necessary for the drums to be operated as may be desired, by a simple operation, de-clutched or clutched. This result is obtained for example in the manner indicated in the drawing. The shaft of the hand-wheel is adapted to pivot on a shaft 16 mounted in the framework and it may be locked as may be desired by a suitable device such as 17 either in the de-clutched position (Figure 1 the worm being withdrawn from the pinion 15) or in the clutched position (Figures 2 and 3, the worm being in engagement with the pinion).

At the rear end of each of the longitudinal beams of the framework 3 is mounted a handle 18 connected to a rod 19 which terminates in a catch or bolt adapted to engage with one of the teeth of a toothed sector 20 formed integrally with the corresponding slide 4. By operating the handles 18 it is thus possible to connect the framework to the slides as may be desired or it may be rendered independent of the said slides.

Finally the apparatus is completed by two brake shoes 21 carried by arms 22 and which may be raised by operating chains or cables 23.

The method of using the apparatus is as follows.

The truck is first brought into position for engagement with the fuselage F of the aeroplane in such a manner that the front edge of the trough 6 will engage under the end of the support B, then the chain 23 is released so that the brake shoes 21 will assume the position shown in Figures 1 and 2 and prevent rearward movement of the truck. The handles 18 are then actuated so as to disengage the framework 3 from the sectors 20 and the hand-wheel 13 is raised (position of Figures 1) in such a manner that the worm 14 is moved out of engagement with its worm wheel 15. When these preliminary operations have been completed the truck is moved forwardly by pushing the framework 3 and seeing that the front edge $a$ of the trough 6 will engage underneath the support B. When the support has been engaged by the trough, the framework 3 is connected to the sectors 20 by actuating the handles 18 and the support is raised by pushing the framework 3. This operation is repeated a number of times until the support B is sufficiently engaged in the trough 6 as indicated in Figure 2.

The hand-wheel 13 is now lowered so as to bring it into the position shown in Figures 2 and 3 in which positon the worm 14 engages with its worm wheel 15 and by turning the hand-wheel the drums 11 are rotated thus winding up the cables 10. By reason of the winding up of the cables the trough 6 rises in the slides up to the end of its travel. When this result has been obtained the rotation of the hand-wheel 13 is continued so as to impart to the upper end of the slides a determined inclination towards the rear (Figure 3) in such a manner that the weight of the tail of the aeroplane will be disposed substantially along a vertical line passing through the point of contact of the wheels with the ground.

At this moment the fuselage of the aeroplane will be effectively supported in the trough of the truck. The brake shoes 21 are raised by pulling the chain 23 (Figure 3) and all that is now required is to follow the movements of the aeroplane, by means of the truck, which may be moved by any suitable means.

It will be understood that the invention is not limited to the details of construction which have been described solely by way of example and a number of these details may be modified without departing from the scope of the invention. For example a single handle may be provided for acting on a single rod 19, this rod carrying at its end a transverse rod provided with a locking catch for engagement with two sectors 20. Moreover the operation for clutching and de-clutching the drums 11 may be effected in any other suitable manner.

Having thus described my invention what I claim as new and desire to secure by Letters Patent is:—

1. A truck of the character described comprising a framework, wheels on which said framework is mounted, slides pivotally mounted in said framework, a trough slidably engaging said slides, means for raising said trough in said slides, and means for locking the slides in relation to the framework.

2. A truck of the character described comprising a framework, wheels on which said framework is mounted, slides pivotally mounted in said framework, a trough slidably engaging said slides, means for raising said trough in said slides, and means for locking the slides in relation to the framework, said means including toothed sectors formed integrally with said slides, and sliding catches with actuating means therefor, said catches being adapted to engage with the teeth of said sectors.

3. A truck of the character described comprising a framework, wheels on which said framework is mounted, slides pivotally mounted in said framework, a trough slidably engaging said slides, means for raising said trough in said slides, and means for locking the slides in relation to the framework, and brake shoes for co-operating with said wheels.

4. A truck of the character described comprising a pair of wheels, a cranked axle connecting said wheels, a framework mounted on said axle, slides pivotally mounted on said axle, means for connecting and disconnecting said slides and said framework, a trough slidably engaging with said slides, chain wheels carried by said trough, guide pulleys carried by said slides, a pair of chains, each of said chains having one end secured to said slides, said chains passing around said chain wheels and around said pulleys, cables connected to the other ends of said chains, and means for winding up said cable so as to raise the trough in the slides.

5. A truck of the character described comprising a pair of wheels, a cranked axle connecting said wheels, a framework mounted on said axle, slides pivotally mounted on said axle, means for connecting and disconnecting said slides and said framework, a trough slidably engaging with said slides, chain wheels carried by said trough, guide pulleys carried by said slides, a pair of chains having one end secured to said slides, said chains passing around said chain wheels and around said pulleys, cables connected to the other ends of said chains, and means for winding up said cable so as to raise the trough in the slides, said means comprising a shaft, a pair of drums for the cables keyed to said shaft, a worm wheel keyed to said shaft, a second shaft pivotally mounted on said framework, a hand-wheel on said second shaft and adapted to rotate the same, a worm on said second shaft engageable with said worm wheel, and means for engagement with said second shaft, said means being adapted to lock the second shaft with its worm either in or out of engagement with the worm wheel.

6. In combination with a truck as claimed in claim 4, a pair of toothed sectors, one toothed sector being formed integral with each slide, a pair of rods slidably mounted in the framework and having their ends arranged for co-operation with the teeth of said sectors, and actuating handles for said rods mounted on said framework.

JEAN GALLAND.